March 11, 1969  C. H. BOOTH  3,431,581
COMBINATION VACUUM CLEANER AND DEFROSTER DEVICE
Filed May 19, 1966  Sheet 1 of 2
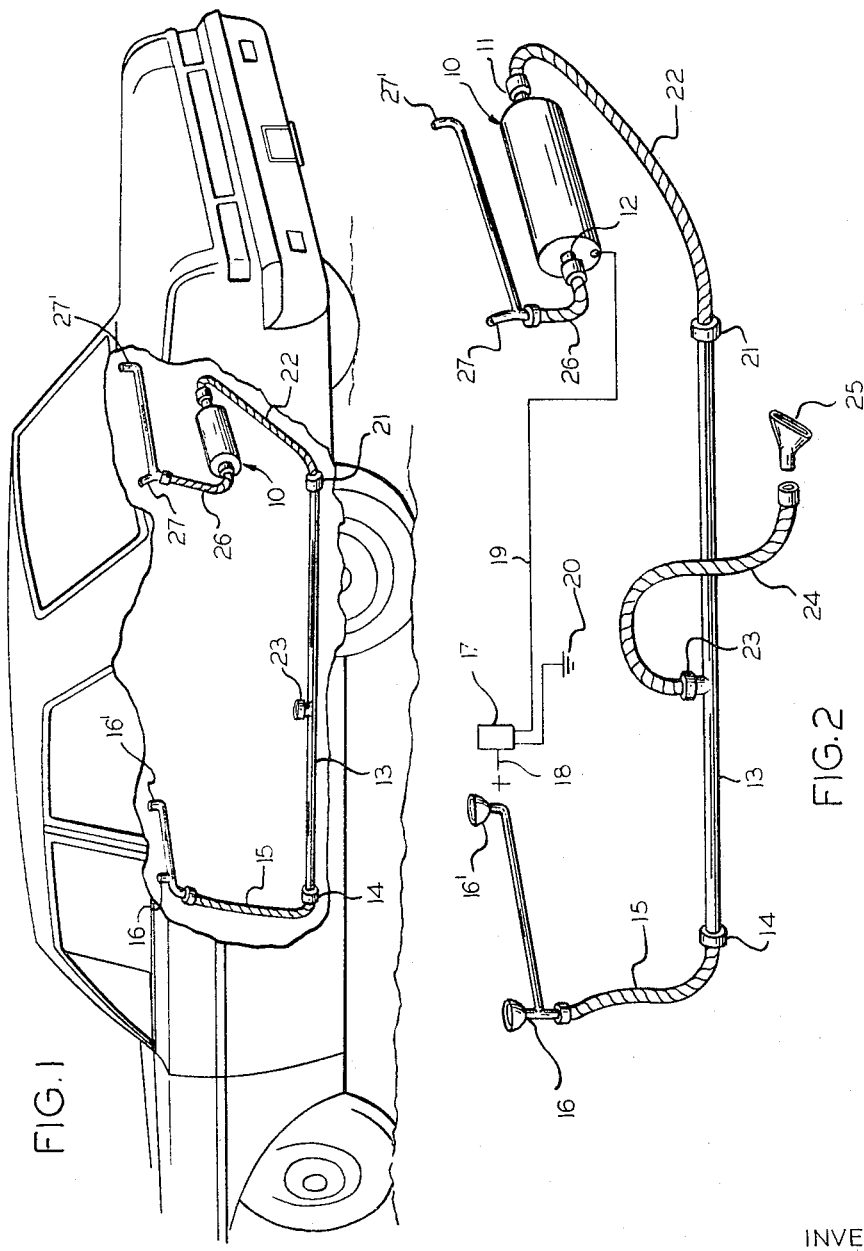
INVENTOR
CARL H. BOOTH
BY Mullin and Alter
ATTORNEYS

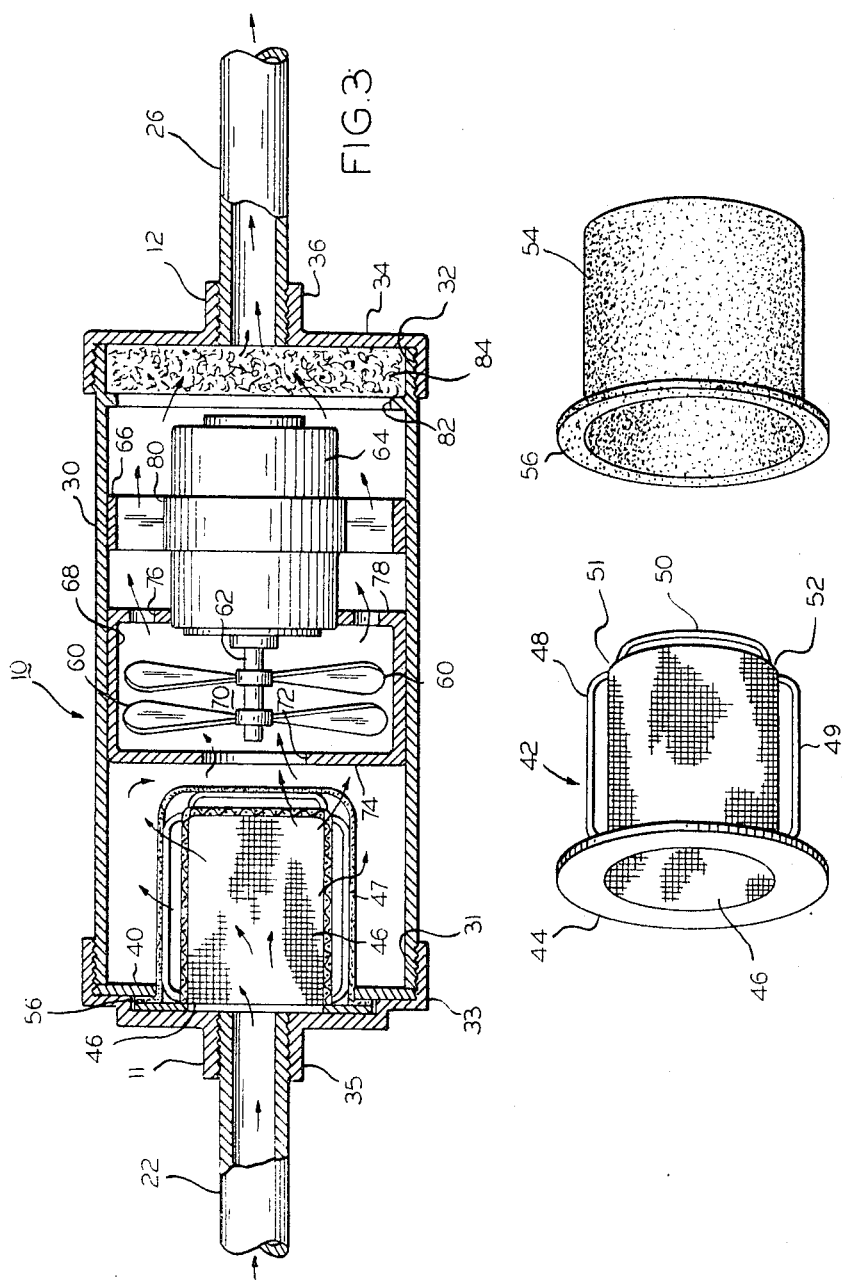

United States Patent Office 3,431,581
Patented Mar. 11, 1969

3,431,581
COMBINATION VACUUM CLEANER AND DEFROSTER DEVICE
Carl H. Booth, 2956 S. 60th St., Milwaukee, Wis. 53219
Continuation-in-part of application Ser. No. 457,376, May 20, 1965. This application May 19, 1966, Ser. No. 554,631
U.S. Cl. 15—313                                       1 Claim
Int. Cl. A471 5/38; B60s 1/54, 1/64

ABSTRACT OF THE DISCLOSURE

A combination vacuum cleaner, ash tray cleaner, air refresher and window defroster for the use in motor vehicles wherein the suction side of an electrical motor driven air pump is coupled to ash trays in the passenger portion of the vehicle and the pressure side is coupled to vents near windows in the passenger portion of the vehicle to provide a defrosting function. Means are provided for filtering and heating the air as it is pumped.

---

This application is in part a continuation of my copending application, Ser. No. 457,376, filed May 20, 1965, now abandoned.

My invention relates to a car defroster and more particularly to a combination vacuum cleaner and defroster device that is adaptable for use in automotive vehicles.

An important object of my invention is to provide a rear window defroster. Another object of my invention is to provide a device that incorporates a vacuum cleaner with an intake leading from ash trays or the like, and an output means extending to windows for their defrosting. The intake from the ash trays could also be used to clean the same.

Another object of my invention is to provide a device of the character described that incorporates a conventional vacuum cleaner having a conduit connected thereto and extending along the vehicle with an inlet disposed therealong with a removable seal to accommodate a pliable tube for cleaning the inside of the vehicle.

Still another object of my invention is to equip the unit with a switch mounted to the instrument panel, or any other convenient place, for controlling the operation of the combination vacuum cleaner and defroster either simultaneously or individually.

A still further object of my present invention is to provide a new and useful cleaning and defrosting device which maintains the ash trays of a vehicle in a clean and wholesome condition, which utilizes the apertures thereof for an air intake, which cleanses and purifies the air and separates therefrom refuse including such flammables as may be present, in a safe and fireproof fashion, which removes from the air, passing therethrough, the obnoxious odors generally characterizing spent cigarette butts and soiled ash trays, and transports the air for forced distribution on and across window surfaces to maintain such windows in a defrosted condition.

It is manifest to anyone familiar with the driving and care of an automobile, that it is oftentimes quite difficult to maintain cleanliness on the inside of the vehicle, and it is therefore a prime object of my invention to provide a device that may be installed into the vehicle during construction, and made a part thereof, or may be installed as an accessory on an existing vehicle.

The purpose and function of the device are discussed with more detail further in the description. The device of the invention is simple in construction, easy to install, manipulated without any special mechanical skill, and highly efficient for the purpose for which it is intended.

According to an embodiment of the invention, an electrical motor driven on mechanical power means and cleaning means is operatively associated with an input means and an output means. The mechanical power means draws the air through the input means and redirects the air through the output means via the cleaning means to cause the air, so directed, to serve as a window defroster. The input means is also adaptable to suck up dust and debris within the car.

These and still further objects of my invention as shall hereinafter appear, are fulfilled by my device in a remarkably unexpected fashion as may be readily discerned from the following detailed description of an embodiment thereof, especially when read in conjunction with the drawings, in which:

FIG. 1 is a perspective view of the general assembly constituting my invention, shown within a fragmentary drawing of an automobile.

FIG. 2 is a schematic view of the assembled device illustrating some of the component parts and their relation to one another.

FIG. 3 is a cross-sectional view of fireproof power and cleaning means according to the invention;

FIG. 4 is an isometric showing of the fine screen wire basket embodied in the means of FIG. 3; and FIG. 5 is an isometric showing of the basket housing embodied in the means of FIG. 3.

Similar characters of reference indicate corresponding parts throughout the several views. Referring now to FIGS. 1 and 2, the character 10 generally indicates a mechanical power means such as a vacuum cleaner which may be installed permanently into the automobile, or attached or suspended from a bracket (not shown), or the like, in the trunk of the vehicle, or in any other convenient or practical location.

My preferred construction for power means 10 will be explained in full detail in my description of FIGS. 3, 4 and 5.

Returning now to FIGS. 1 and 2, vacuum cleaner 10 is equipped with an inlet port 11, and an outlet port 12.

There is a longitudinal hollow tubular member 13, attached to the bottom frame structure of the vehicle, in any efficient and practical manner. The forward end 14 of the tubular member 13, is fitted with a pliable tube 15, leading to an intake member shown as having two intakes.

In the schematic illustration of FIG. 2, the intake 16 and 16' is shown to include a pair of ashtrays wherethrough the air is drawn along with any dust and debris that may be present. The ash trays may be recessed into, or attached to the instrument panel of the vehicle.

Intake tube 16 and 16' may be positioned in any convenient location. However, when the invention is used primarily as a defroster, preferably it should be positioned where it has access to warm air to enable the vacuum cleaner 10 to suck the warm air through the tubing. Tube 15 may be equipped with shutoff valves (not shown) for the convenience of the driver of the vehicle.

A switch 17 is located on the instrument panel and is connected to the source of energy preferably to the automobile electrical power source (not shown) by wire 18. Electrical power is transmitted from the switch 17 to the vacuum cleaner 10 via wire 19, and the circuit is grounded in the conventional manner at 20.

The rearward end of the tubular member 13 shown as 21, has a pliable tube 22 leading from it to the inlet port 11 of the vacuum cleaner 10, so that when the vacuum cleaner is actuated, it will draw the air through the ash trays 16 and 16'.

In the illustrated embodiment it is seen that the inlet conduit comprises pliable tube 22, tubular member 13 and pliable tube 15 and the outlet conduit includes only pliable tube 26. However, additional tubing may be connected to pliable tube 26 if necessary.

The tubular member 13 is shown equipped with an inlet 23 which may be disposed at any convenient location in the floor of the vehicle, and equipped with a cover or seal. This inlet 23 is designed to accommodate a pliable vacuum tube shown as 24, having a conventional nozzle 25 attached thereto, and when the tube 24 is attached, it may be employed to permit cleaning the floor, the seats, or any part of the automobile. Pliable tube 15 may also be made adaptable as a vacuum cleaner.

The outlet port 12 of the vacuum cleaner 10, is shown connected to a pliable tube 26, leading the air from the outlet port to the exhaust outlets 27 and 27′. Obviously, the outlets 27 and 27′ may be equipped with manually operated valves (not shown) to enable the rear window of the vehicle to be defrosted at will. It is also within the contemplation of the invention to include a remote control so that the driver could turn the defroster "off" and "on."

When the defrosting assembly is equipped with controls to permit it to be turned off while the power means 10 is operative, a suitable exhaust means (not shown) will be provided to preclude a pressure buildup in the outlet system of the power means 10.

Referring now to FIGS. 3, 4 and 5, my power and cleaning means 10 will now be described in detail. It is, of course, understood that when I use the term "vacuum cleaner" herein, I am referring to a suction device which is capable of drawing air through itself by the creation of a combined pull-push effect. Thus, means 10 operates to pull or suck air into itself via the inlet 11 while simultaneously functioning on the air which has already accumulated therein to push it out through outlet 12.

As shown in FIG. 3, my power means 10 comprises an inlet 11 and an outlet 12 to which are respectively connected pliable tubings 22 and 26 as previously described.

Means 10, in accordance with my preferred embodiment more particularly comprises a cylindrical housing 30 having threaded portions 31, 32 at each end thereof for respectively receiving and holding threaded caps 33, 34, in removable engagement therewith. As shown, cap 33 includes an extending cylindrical flange 35 which defines inlet 11 and with which tube 22 is connected, either by insertion therein as shown or by stretching thereover (not shown). In a similar fashion, cap 34 is provided with flange 36 which defines outlet 12 and with which tube 26 is coupled.

An annular ring 40 is operatively disposed on the end of housing 30 and arranged for tight engagement between housing 30 and cap 33 for reasons which shall hereinafter appear.

One of the members of my assembly comprises a debris basket assembly 42 which is shown in detail in FIG. 4.

Basket assembly 42 comprises an annular mouthpiece 44 which is provided with an outside diameter of sufficient dimension relative to annular ring 40 to permit mouthpiece 44 to be supported between annular ring 40 and cap 33 when means 10 is fully assembled.

Basket assembly 42 further comprises a wire basket 46, formed of fine mesh wire screen which is secured at its open end to the underside of mouthpiece 44. A wire frame 47 comprising at least two side ribs 48, 49, interconnected by an end rib 50 are attached to mouthpiece 44 and protect basket 46 from disfigurement as will be explained. The junctions 51, 52 of side ribs 48, 49 with bottom rib 50, respectively, may engage basket 46 for support but the remainder of frame structure 47 is preferably disposed in spaced relationship with basket 46.

When assembled, basket assembly 42 is enclosed by a receptacle 54, formed preferably of fiberglass or other suitable fireproof material, which surrounds wire basket 46 and is maintained in shape by ribs 48, 49, 50. Receptacle 54 is also provided with an annular mouthpiece 56 which engages and overlaps the innermost annular portion of annular ring 40.

When the inlet assembly is complete, it thus comprises annular ring 40 disposed in engagement with the end of housing 30 and is, in turn, engaged by mouthpiece 56 of receptacle 54 and it, in turn, is engaged by mouthpiece 46 of the basket assembly 42 which is sandwiched therebetween in substantially air tight engagement by cap 33 being firmly screwed into its desired position.

Power and cleaning means 10 further comprises a plurality of fan blades 60 mounted on a shaft 62 driven by a suitable motor 64 which is mounted to housing 30 by support 66. Fan blades 60 are surrounded by a housing 68 to define a fan chamber 70 having a central inlet 72 defined in the leading wall 74 thereof in substantial registry with but slightly smaller than the bottom of basket 46 and a peripheral outlet defined by a plurality of ports 76 defined in the trailing wall 78 thereof. Inlet 72 and ports 76 coact with the movement of blades 60 to give positive control to the flow of air therethrough and to cause the air to surround the motor 64 and take up the heat dissipated thereby to heat the air and cool the motor, both desired objectives in my system.

The air in passing past motor 64 is directed through suitable apertures 80 defined in motor support 66 with cap 34 to secure a filter batt 84 therebetween.

Filter batt 84 is preferably formed of a fiberglass matrix containing activated charcoal particles dispersed therethrough although other of the known air purifying and deodorizing filter materials may be employed as desired.

The warmed air, in passing through filter 84 has sumstantially all fine dust and odor removed therefrom and passes therefrom through outlet 12 and tubing 26 in the manner already described.

From the foregoing it is apparent that my preferred power and cleaning means not only actuates the air in a positive and directed fashion, its several components coact to remove trash, dust, and noxious odors from the air in a safe and fireproof manner, it also adds heat to the air so that when it is distributed, it not only serves to defrost frosted windows, it is in a condition which will be generally acceptable as pleasant and wholesome.

In operation, the driver will actuate motor 64 which rotates shaft 62 and fan blades 60 mounted thereupon to draw a flow of air in through inlets 16, 16′ via tube 15, conduit 13, tube 22 and inlet 11 into power and cleaning means 10. Here, in passing through wire basket assembly 42 and fireproof receptacle 54, any trash contained by the incoming air, including cigarettes and cigars, either dead or alive, is safely and effectively removed therefrom. And even if a live butt should ignite a stray gum wrapper, such fire as may result is effectively isolated by the fireproof receptacle.

The trash free air is further moved through a fan chamber and past the motor, where it may be heated either by its motion contiguous to the motor or by the use of an electrical heating element, into filter material which removes any remaining dust and odor therefrom and thence via outlet 12 and conduit 26 to distributors 27, 27′ which direct the air onto and across a frosted window.

The device is simple in construction and simple to install, yet positive in its performance.

From the foregoing description and the drawings, it should be apparent that I have provided a novel combination vacuum cleaner and defroster which accomplishes the aforestated objects in a remarkable unexpected fashion. Furthermore, the device could be used separately as a vacuum cleaner or a defroster and may function as both simultaneously. When used only as a defroster, the device sucks air in and applies the air across the window for defrosting.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the spirit of my invention, especially as it is defined in the appended claim.

What I claim and desire to secure by Letters Patent of the United States is:

1. A combination vacuum cleaner and defroster for motor vehicles comprising:

a suction device having an inlet port and an outlet port both in the passenger bearing portion of the vehicle, said suction device being actuable to draw air therein through said inlet port, and to deliver only said air through said outlet port, input means connected to said inlet port wherethrough said air and debris is drawn, said input means comprising ash tray means at the free end thereof, whereby said air passing through said ash trays as it is drawn into said suction device carries debris from said ash tray means therewith, output vent means connected to an output port adjacent to windows of said motor vehicle to cause air from said output port to flow across the windows, control means for actuating said suction device to simultaneously draw air and debris thereinto through said input means and to emit air through said output means to defrost said windows, said suction device comprising: a fire proof air permeable debris basket for separating debris from the incoming air, a motor driven fan having the motor located in the air stream thereof when the fan is sucking said incoming air through said trash basket thereby heating said air by forcing said air across said motor, and filter means located at the end of the motor opposite said fan whereby said air is forced through said filter means into said output means.

References Cited

UNITED STATES PATENTS

| 2,017,579 | 10/1935 | Anderson | 98—2 XR |
| 2,218,265 | 10/1940 | Norwood | 15—313 XR |
| 2,340,944 | 2/1944 | Easter. | |
| 2,492,506 | 12/1949 | Stinnett | 98—2 |
| 3,230,567 | 1/1966 | Nickless | 15—313 |

FOREIGN PATENTS

| 461,603 | 2/1937 | Great Britain. |

ROBERT W. MICHELL, *Primary Examiner.*